US005486434A

United States Patent [19]

Aoyama

[11] Patent Number: 5,486,434

[45] Date of Patent: Jan. 23, 1996

[54] BATTERY TERMINAL

[75] Inventor: Masahiko Aoyama, Yokkaichi, Japan

[73] Assignee: Sumitomo Wiring Systems, Ltd., Yokkaichi, Japan

[21] Appl. No.: 239,875

[22] Filed: May 9, 1994

[30] Foreign Application Priority Data

May 25, 1993 [JP] Japan .................................... 5-122923

[51] Int. Cl.$^{6}$ ..................................................... H01M 2/30

[52] U.S. Cl. ........................... 429/178; 429/65; 429/121; 439/765; 439/756; 439/766

[58] Field of Search ............................ 429/65, 121, 178; 439/765, 756, 762, 766, 772, 758, 759, 769, 770

[56] References Cited

U.S. PATENT DOCUMENTS

| | | | |
|---|---|---|---|
| 1,930,772 | 10/1933 | Richter et al. | 439/759 |
| 1,968,137 | 7/1934 | Gay | 439/758 |
| 2,067,934 | 1/1937 | Lienhart et al. | 429/121 |
| 5,290,646 | 3/1994 | Asao et al. | 429/178 |
| 5,302,142 | 4/1994 | Tabata | 439/762 |
| 5,302,143 | 4/1994 | Inoue et al. | 439/762 |

FOREIGN PATENT DOCUMENTS

| | | | |
|---|---|---|---|
| 0278918 | 8/1988 | European Pat. Off. . | |
| 856473 | 11/1952 | Germany | 439/756 |
| 4-9736 | 3/1992 | Japan . | |

*Primary Examiner*—Charles L. Bowers, Jr.
*Assistant Examiner*—John A. McPherson
*Attorney, Agent, or Firm*—Sandler, Greenblum & Bernstein

[57] ABSTRACT

A battery terminal includes a main member and ring member, each made from a conductive metal. A stud bolt for cable connection projects from the main member. A post fitting is provided in the ring member. The ring member is placed on top of the main member with one end of the ring member supported by the main member and the other end at an angle floating free above the main member. This other end is passed over the stud bolt and the post fitting of the ring member is fit over the battery post. The battery cable terminals are fit onto the stud bolt. When the nut is tightened on the stud bolt, the terminals are tightened against the ring member, which is at an angle to the battery post, and the post fitting of the ring member is forced down and clamped against the battery post. Thus, securing the battery terminal to the battery post and securing the cable terminals to the battery terminal can be simultaneously completed by a single thread tightening operation.

9 Claims, 6 Drawing Sheets

BATTERY TERMINAL

BACKGROUND OF THE INVENTION

1. Field of the Invention

The present invention relates to a battery terminal mounted to the battery post of a battery installed in a motor vehicle, and relates specifically to a battery terminal whereby the task of securing the battery terminal to the battery post and the task of securing the terminal to the cable connector of the battery terminal can be accomplished by a single thread tightening operation.

2. Description of the Prior Art

In a conventional battery terminal of this type, the task of securing the battery terminal to the battery post and the task of securing the cable-side connecting terminal to the cable connector of the battery terminal are separate tasks.

As shown in FIG. 11, the battery terminal is made from a single metal member, and comprises a ring-shaped post fitting 2 of which one end is open and which is formed to fit over the battery post 1, clamping members 3*a* and 3*b* contiguous on both sides to the open ends of the post fitting 2, and a cable connector 4 contiguous to the closed side of the post fitting 2.

In a stud type battery terminal of this type wherein a stud bolt 5 projects from the cable connector 4, the bolt holes of the terminals T1 and T2 are separately crimped to the cables W1 and W2 connected to the battery are passed over the stud bolt 5 and clamped from above by a nut 6.

The post fitting 2 is similarly fitted over the battery post 1, and a nut 8 is tightened onto the bolt 7 previously passed through the clamping members 3*a* and 3*b*, thus closing the open end of the post fitting 2 contiguous to the clamping members 3*a* and 3*b*, and thereby clamping the post fitting 2 securely to the battery post 1.

With this conventional battery terminal, however, an impact wrench or similar tool is used from the side to clamp the battery terminal to the battery post. In most late-model passenger vehicles, however, the engine compartment is extremely crowded, and the proximity of other components makes it difficult to adequately tighten the post fitting by applying a horizontal force because of interference from other components. It is even possible for the impact wrench to contact the negative terminal while tightening the positive post fitting, possibly causing an electrical short which, in a worst-case scenario, could cause an engine compartment fire.

In addition, this battery terminal design requires separate tasks to secure the battery terminal to the battery post and secure the battery cable terminal to the cable connector of the battery terminal. The separation of these tasks increases the total time required to complete both.

It is also necessary to consider the assembly sequence when designing the battery terminal, and the location of the cable connectors must be carefully considered to prevent interference between the air ducts and other components with the cable connector, cable terminals, and cables while assembling the battery terminal to the battery post. These limitations noticeably reduce the degree of freedom in battery and terminal design.

SUMMARY OF THE INVENTION

Therefore, an object of the present invention is to provide a battery terminal whereby productivity can be increased by completing connection of the cable terminal to the battery terminal and securing the battery terminal to the battery post in a single operation, and whereby the degree of freedom in battery terminal design is increased by positioning the cable connector and the battery cable in a direction preventing interference with other components during assembly of the battery terminal to the battery post.

To achieve this object, a battery terminal for connecting a battery post to a cable, according to one preferred embodiment of the present invention comprises a main member, a ring member and a nut. The main member is a flat piece and comprises: a post fitting portion having a first battery post fitting hole for receiving the battery post at the center thereof; a ring support is provided continuous to one side of the post fitting portion; a cable connector portion provided continuous to other side of the post fitting portion; and a stud bolt projecting vertically upward from said cable connector portion. The ring member placed over said main member, comprises: a post fitting portion having a second battery post fitting hole for receiving the battery post at the center thereof and a cone-shaped clamping piece projecting upward around the inside edge of the battery post fitting hole; a clamping member on one side of the post fitting portion; and a cable connector portion with a bolt hole on other side of the post fitting portion through which said stud bolt is inserted, said cable connector portion being bent at a predetermined angle with respect to said post fitting portion. The nut is mounted onto said stud bolt, whereby the battery terminal is assembled such that the end of the clamping member of the ring member is supported by the ring support of the main member, and the post fitting portion and the cable connector portion of the ring member are at a rising slope to the main member, and such that tightening the nut onto the stud bolt clamps the cable terminal to the ring member and simultaneously pushes the clamping piece of the ring member fit at an angle over the battery post down against the battery post.

Because the post fitting of the ring member is fit over the battery post at an angle and a nut is then tightened to deform the post fitting coaxially to the battery post while pushing the post fitting down, a slit is also provided in the clamping member side of the post fitting of the ring member, and a slit continuous to said slit is provided through the widthwise center of the clamping member to divide the clamping member into two right and left clamping pieces. Alternatively, the bolt hole provided in the cable connector of the ring member may be an oval.

A seal member attached to the bottom of the main member is also provided.

When the above slits are provided in the ring member, engaging members engaging the outside faces of the clamping pieces separated by the slit project from the flexible seal member.

A battery terminal according to a second embodiment of the invention comprises a main member, a ring member and a nut. The main member is a flat piece and comprises: a post fitting portion having a first battery post fitting hole for receiving the battery post at the center thereof; a semiconical clamping piece projecting at one side of the inside face of the battery post fitting hole; a ring support provided continuous to one side of the post fitting portion; a cable connector portion provided continuous to other side of the post fitting portion; and a stud bolt projecting vertically upward from said cable connector portion. The ring member placed over said main member, comprises: a post fitting portion having a second battery post fitting hole for receiving the battery post at the center thereof and a semiconical clamping piece projecting at one side of the inside edge of the battery post fitting hole on a side opposite that of the semiconical clamping piece of the main member; a clamping member on one side of the post fitting portion; and a cable connector portion with a bolt hole on the other side of the post fitting portion through which said stud bolt is inserted, said cable connector portion being bent at a predetermined angle with respect to said post fitting portion. The nut is mounted onto said stud bolt, whereby the battery terminal is assembled such that the end of the clamping member of the ring member is supported by the ring support of the main member, and the post fitting portion and the cable connector portion of the ring member are at a rising slope to the main member, and such that tightening the nut onto the stud bolt clamps the cable terminal to the ring member and simultaneously pushes the semiconical clamping piece of the ring member, which is fit at an angle over the battery post, down to clamp the battery post between the two clamping pieces of the ring member and the main member.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
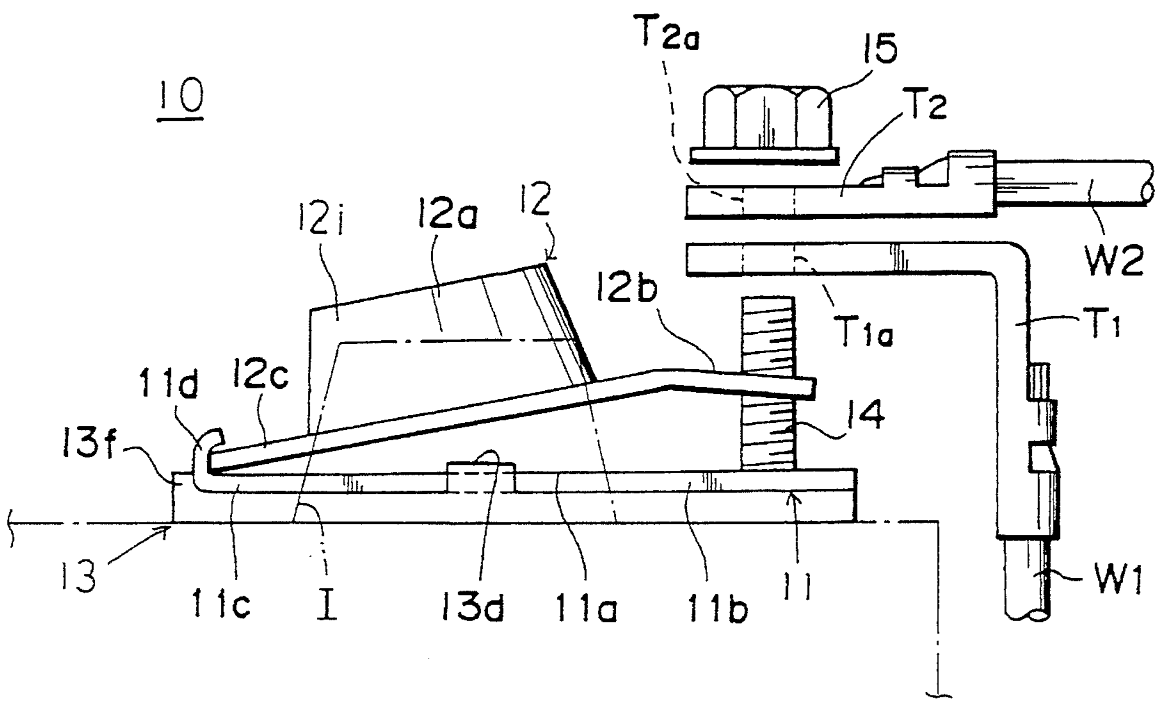
FIG. 1 is a cross sectional side view of a battery terminal according to the first preferred embodiment of the present invention, particularly showing an operation to place the cable terminals and the battery terminal.

The preferred embodiments of a battery terminal according to the present invention are described below with reference to the accompanying figures, of which FIGS. 1–6 show the first embodiment.

A battery terminal 10 according to the present invention comprises a main member 11 (FIG. 5) and a ring member 12 (FIG. 4), both made of a conductive metal material. A flexible seal member 13 (FIG. 6) is attached to the bottom of the main member 11, and a clamping piece for clamping to the outside surface of the battery post is provided on the ring member 12.

The main member 11 (FIG. 5) is made from a flat piece with a ring-shaped post fitting 11*a* having a battery post fitting hole 11*e* at the center of the main member 11 and the post fitting 11*a*. A rectangular cable connector 11*b* extends from one side of the post fitting 11*a*, and a ring support 11*c* extends from the other side.

A stud bolt 14 projects vertically upward from the cable connector 11*b*, and a presser member 11*d* is bent upward at the end of the ring support 11*c*.

The ring member 12 (FIG. 4) is also made from a flat piece with a post fitting 12*a* having a battery post fitting hole 12*h* at the center thereof. A cone-shaped clamping piece 12*i* projects upward around the inside edge of the battery post fitting hole 12*h*. A rectangular cable connector 12*b* extends from one side of the post fitting 12*a*, and a clamping member 12*c* extends from the other side.

As shown in FIG. 1, the post fitting 12*a* and cable connector 12*b* are not provided in a straight line, but offset at a slight angle. A bolt hole 12*d* is also provided in the cable connector 12*b*.

A slit 12*e* provided at the center of the post fitting 12*a* on the clamping member 12*c* side continues into the slit 12*f* running from the bottom of slit 12*e* through the center and to the outside end of the clamping member 12*c*. The clamping member 12*c* is thus divided into right and left clamping members 12*c*-1 and 12*c*-2 by the slit 12*f*. These right and left clamping members 12*c*-1 and 12*c*-2 are contiguous to the two sides of the opening in post fitting 12*a*, which is similarly divided by the slit 12*e*.

The seal member 13 (FIG. 6) attached to the bottom of the main member 11 is shaped essentially like the main member 11: a ring member 13*a* provided at the center of the seal member 13 is flanked on both sides by flat members 13*b* and 13*c*.

To attach the seal member 13 to the main member 11, two inverted L-shaped engaging tabs 13*d* are provided on opposing sides of the ring member 13*a*, and are spaced to engage the outside edge of the post fitting 11*a* of the main member 11. A third inverted L-shaped engaging tab 13*e* is provided at the end of the one flat member 13*b* to engage the end of the cable connector 11*b* part of the main member 11.

Engaging members 13*f* and 13*g* similarly project up from the end and both sides of the other flat member 13*c*. The end engaging member 13*f* engages the outside face of the presser member 11*d* of the main member 11. The two side engaging members 13*g* engage the outside of the right and left clamping members 12*c*-1 and 12*c*-2 of the ring member 12 placed on the main member 11.

The operation whereby the terminals T1 and T2 crimping the wires W1 and W2 are simultaneously secured to the battery terminal 10 and to the battery post 1 is described below.

The battery terminal 10 is assembled by attaching the seal member 13 to the bottom of the main member 11, placing the ring member 12 on top of the main member 11, and inserting the ends of the clamping members 12*c*-1 and 12*c*-2 of the ring member 12 into the presser member 11*d* of the main member 11 with the outside sides of the clamping members 12*c*-1 and 12*c*-2 contacting the engaging members 13*g* of the seal member 13. The bolt hole 12*d* in the cable connector 12*b* of the ring member 12 is also passed over the stud bolt 14 projecting from the main member 11.

While the bottoms of the clamping member 12c and post fitting 12a are in a straight line, the post fitting 12a is at an angle to the cable connector 12b. As a result, when the ring member 12 is assembled to the main member 11, the post fitting 12a is positioning at a rising slope from the pivot point of the presser member 11d stopping the ends of the clamping member 12c, and the cable connector 12b is thus positioned at a downward slope from the post fitting 12a as shown in FIG. 1.

The assembled battery terminal 10 is then placed over the battery post 1. Specifically, the ring member 13a of the seal member 13, and the battery post fitting holes 11e and 12h of the ring-shaped post fitting 11a of the main member 11 and the post fitting 12a of the ring member 12, respectively, are fitted over the battery post 1.

The inside diameter of the ring member 13a of the seal member 13 and the battery post fitting hole 11e of the main member 11 is greater than the large diameter at the base of the conical battery post 1. As a result, the ring member 13a and battery post fitting hole 11e can be smoothly fitted over the battery post 1, and the seal member 13 and main member 11 can be placed level and flat against the top of the battery as indicated in FIG. 1.

The conical clamping piece 12i of the ring member 12 to the ring member 12, however, is sized to contact the outside face of the battery post 1, and while the clamping piece 12i fits over the top of the battery post 1, it cannot be easily seated. The post fitting 12a is also at an angle to the main member 11. The ring member 12, as a result, remains at an angle to the battery post 1 as shown in FIG. 1.

With the seal member 13, main member 11, and ring member 12 thus assembled to the battery post 1 as shown in FIG. 1, the terminals T1 and T2 to be connected to the battery are slid onto the stud bolt 14, i.e., the bolt hole T1a of the one terminal T1 is fitted onto the stud bolt 14 projecting from the cable connector 12b of the ring member 12, and the bolt hole T2a of the other terminal T2 is then fitted onto the stud bolt 14 over the first terminal T1.

A nut 15 is then threaded onto the stud bolt 14 and tightened with an impact wrench or similar tool (not shown in the figures) from above. When the nut 15 is tightened, the ring member 12 resting at an upward slope from the main member 11 is pushed down by the nut 15, thus horizontally displacing the post fitting 12a and clamping member 12c. As a result, the clamping piece 12i of the post fitting 12a fitted over the battery post 1 is forced down coaxially to the battery post 1. While a force spreading the clamping piece 12i also operates at this time, the slit 12e in the clamping piece 12i and the slit 12f in the clamping member 12c allow the clamping members 12c-1 and 12c-2 to spread, thus absorbing the force acting on the clamping piece 12i.

While the sides of the clamping members 12c-1 and 12c-2 contact the engaging members 13g of the seal member 13, the seal member 13 is made from a flexible material, thus permitting the engaging members 13g to be elastically deformed when the clamping members 12c-1 and 12c-2 are displaced to the outside. As a result, the seal member 13 is returned to its original shape due to its inherent resiliency when the external force acting on the clamping members 12c-1 and 12c-2 is alleviated, and restores the clamping members 12c-1 and 12c-2 to a gapless state.

Figure 2:
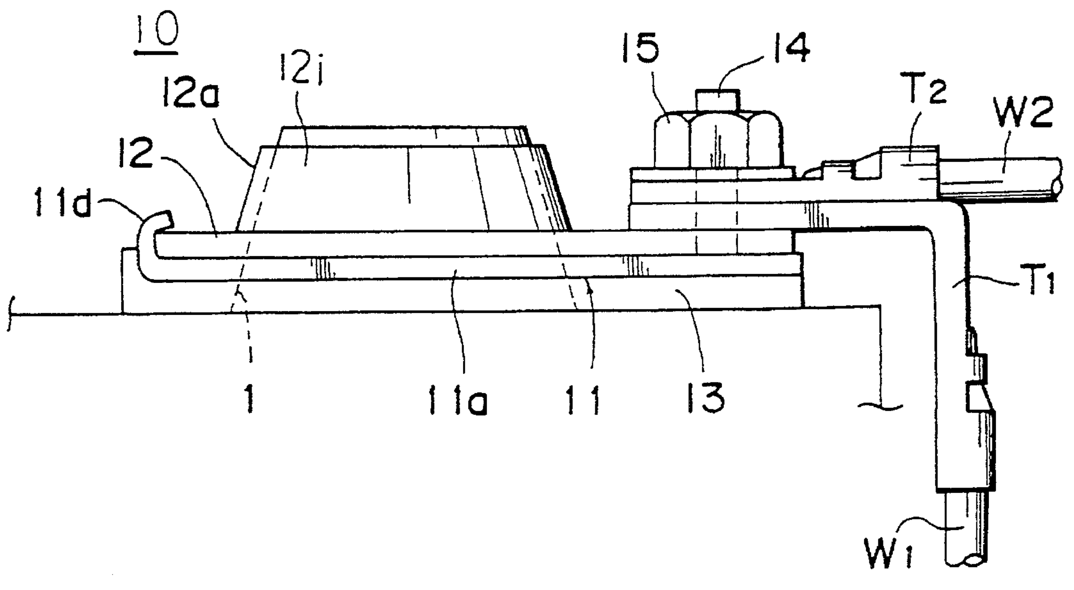
FIG. 2 is a view similar to FIG. 1, but particularly showing the battery terminal when the cable terminals are secured to the battery terminal and the battery terminal is secured to the battery post.
Figure 3:
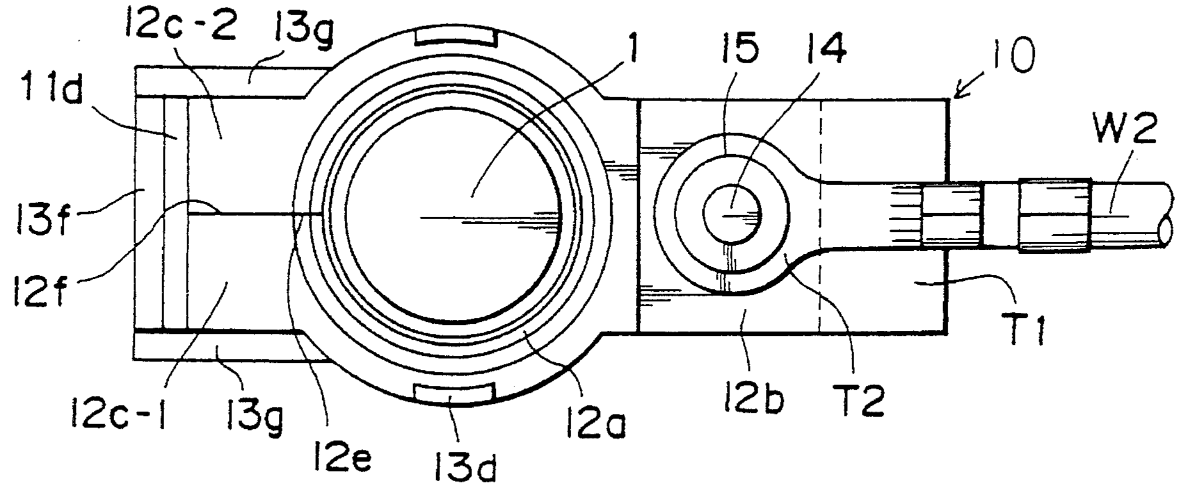
FIG. 3 is a top plan view of FIG. 2.
Figure 4:
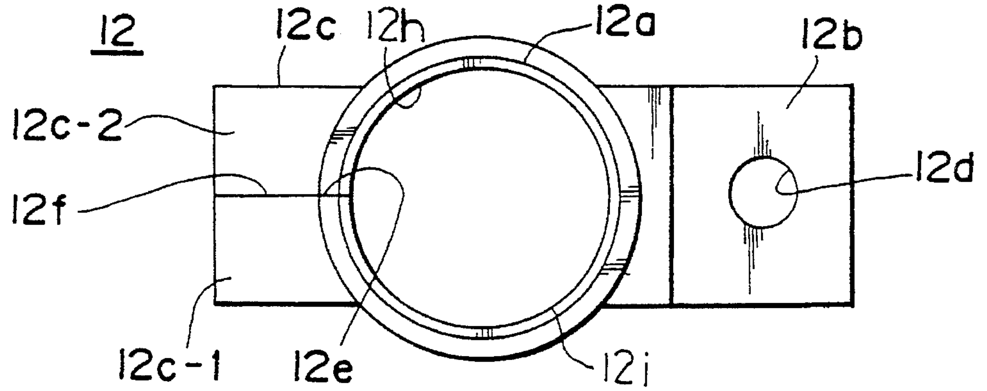
FIG. 4 is a top plan view of the ring member of the battery terminal.
Figure 5:
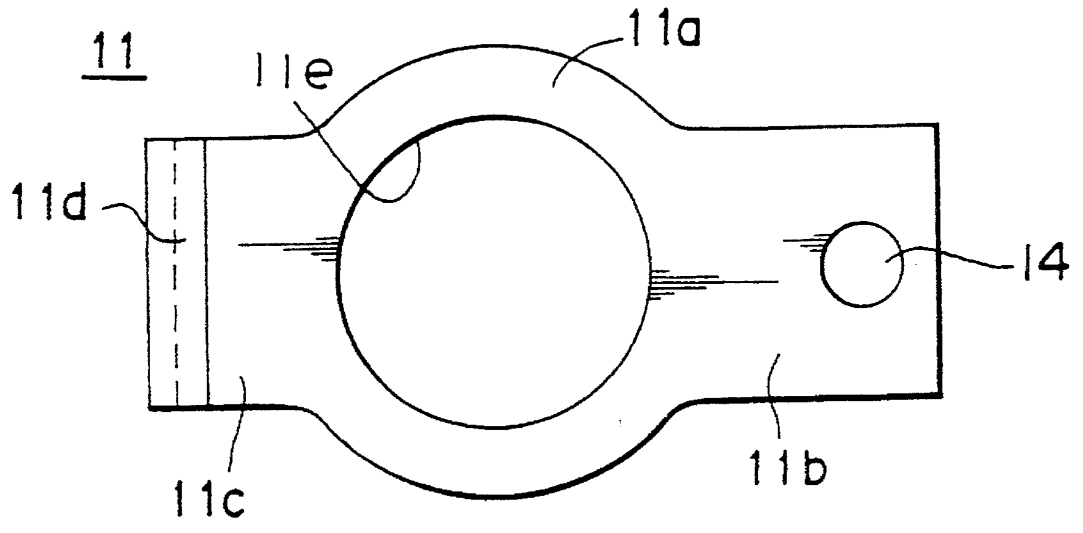
FIG. 5 is a top plan view of the main member of the battery terminal.
Figure 6:
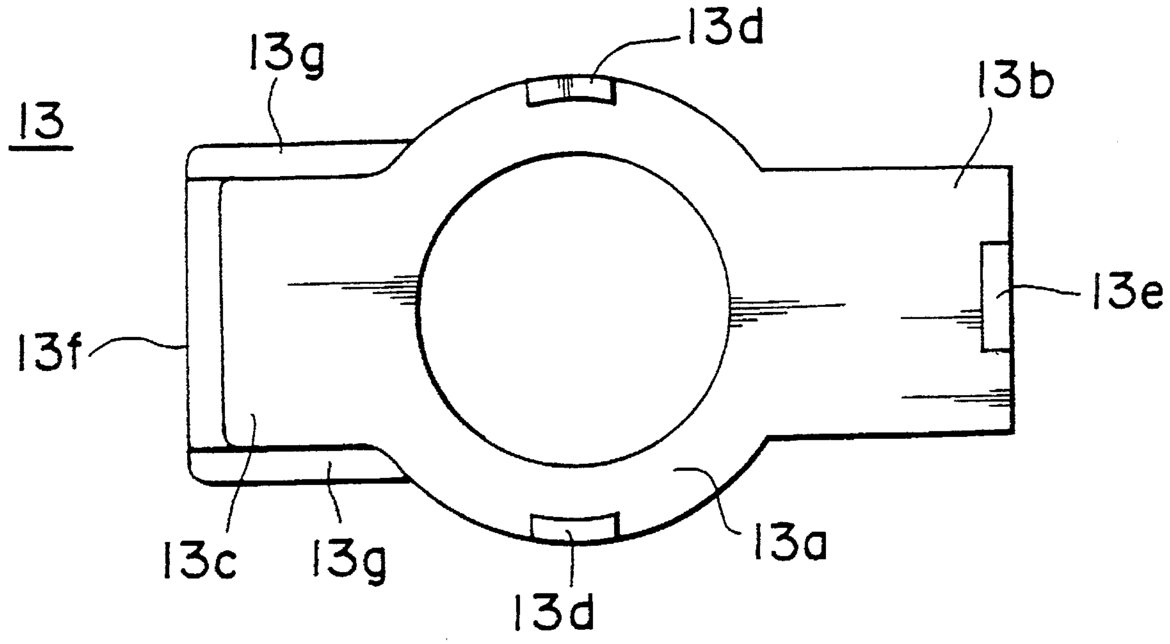
FIG. 6 is a top plan view of the seal member of the battery terminal.

Specifically, the force spreading the clamping piece 12i is alleviated when the post fitting 12a and clamping member 12c have been pushed down to a horizontal position as shown in FIG. 2 by tightening the nut 15 because the clamping piece 12i of the post fitting 12a is dimensioned to contact the outside face of the battery post 1 when fully seated. As a result, the force separating the clamping members 12c-1 and 12c-2 connected to the clamping piece 12i is removed, the gap in the slit 12f is eliminated by the elastic restoring force of the engaging members 13g of the seal member 13, and the gap in the slit 12e in the post fitting 12a is also eliminated.

It is therefore possible to secure the post fitting 12a to the battery post 1 by tightening the nut 15 to fasten the battery cable terminals T1 and T2 to the stud bolt 14.

A second embodiment of the present invention is described below with reference to FIGS. 7–10. In this embodiment clamping members fitting over and clamping to the battery post 1 are provided on both the main member 11 and the ring member 12, and a slit is not provided in the clamping member 12c of the ring member 12.

Specifically, a semiconical clamping member 11f projects from the inside edge on one side of the battery post fitting hole 11e in the post fitting 11a of the main member 11 (FIG. 9), and a semiconical clamping member 12j projects from the inside edge on the opposite side of the battery post fitting hole 12h in the ring member 12.

Other aspects of the configuration of the second embodiment are the same as in the first embodiment described above, and further description is therefore omitted below.

Figure 7:
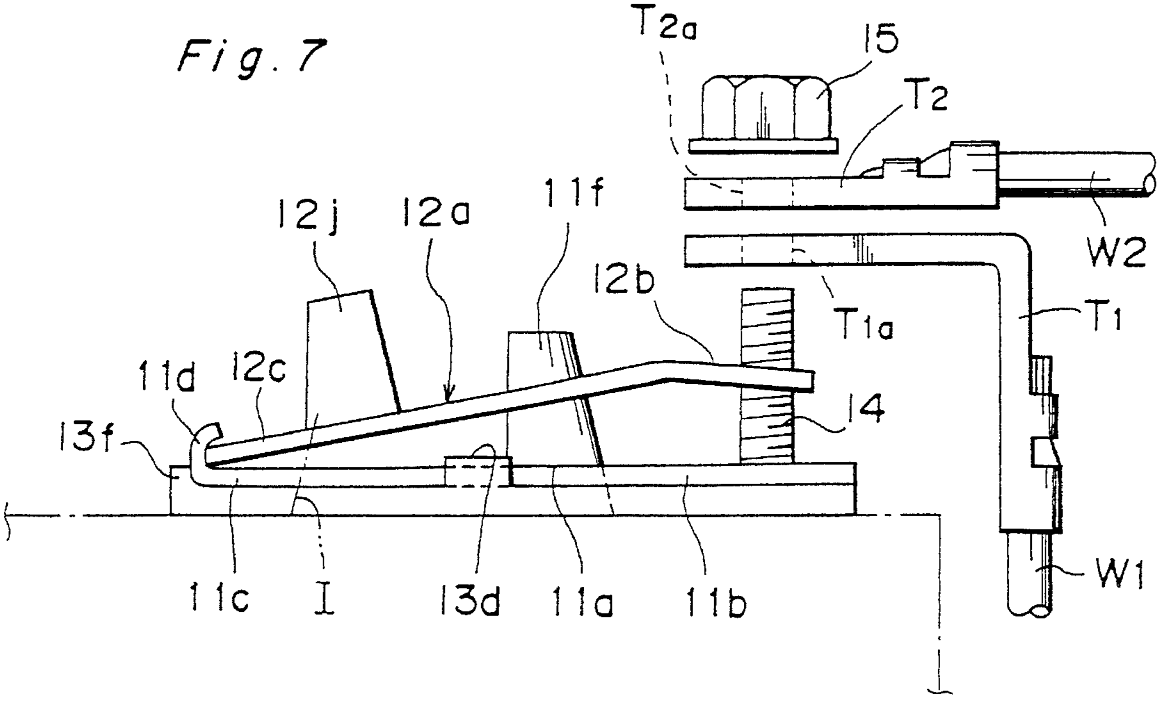
FIG. 7 is a cross sectional side view of a battery terminal according to the second embodiment of the present invention, particularly showing an operation to place the cable terminals and the battery terminal.
Figure 8:
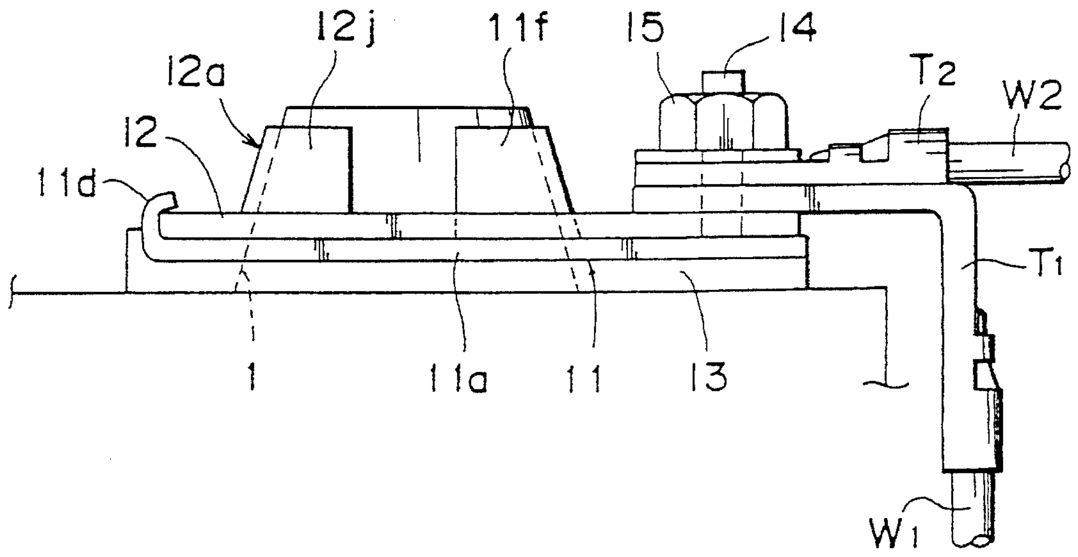
FIG. 8 is a view similar to FIG. 7, but particularly showing the battery terminal of the second embodiment when the cable terminals are secured to the battery terminal and the battery terminal is secured to the battery post.
Figure 9:
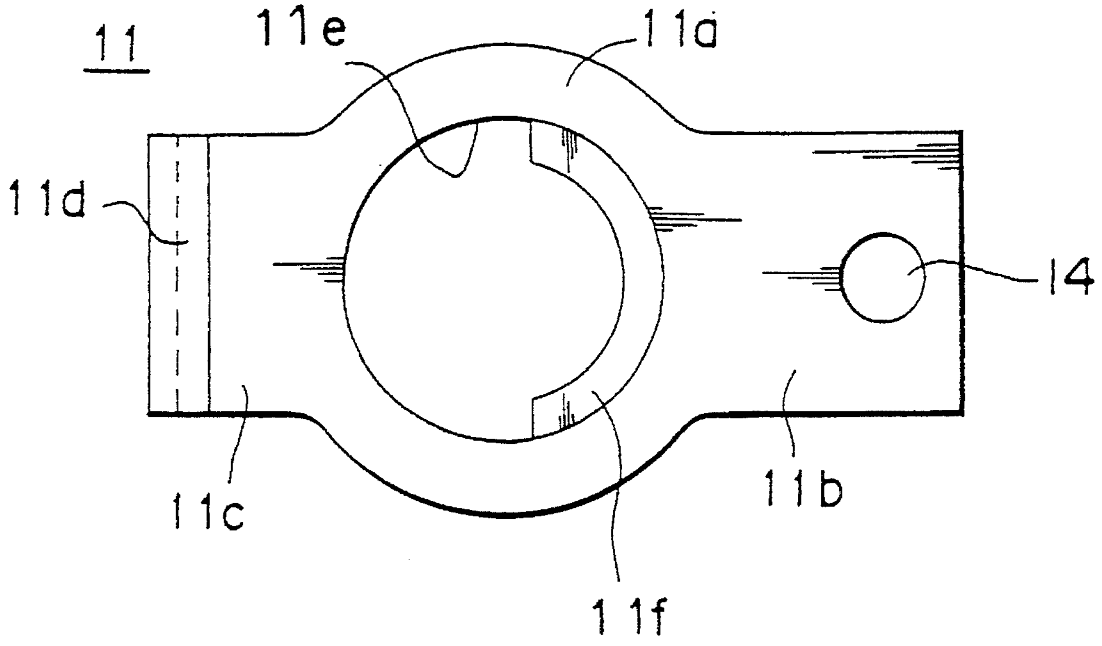
FIG. 9 is a top plan view of the main member of the battery terminal according to the second embodiment.
Figure 10:
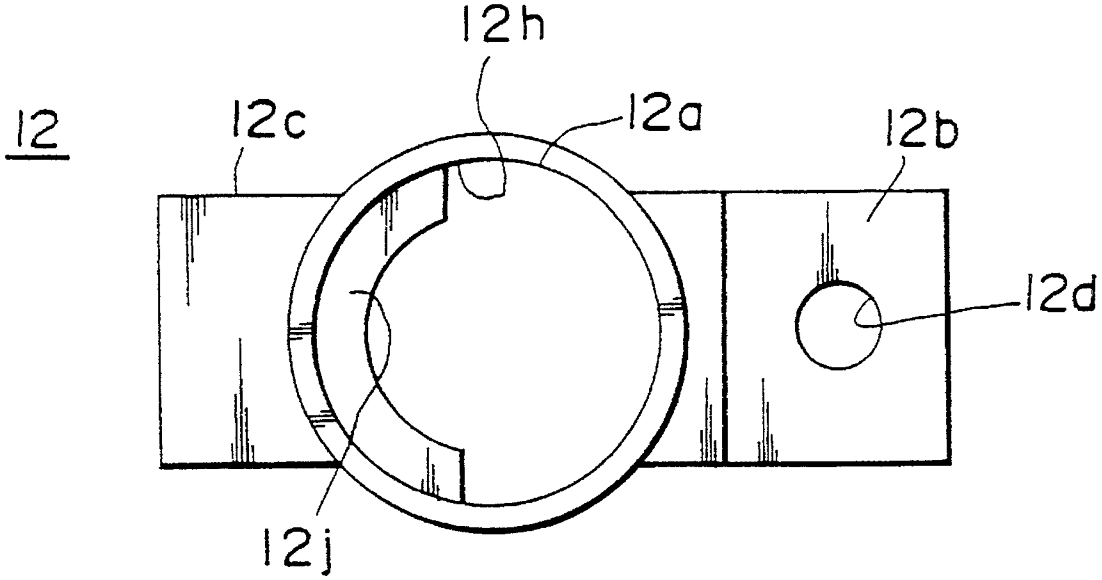
FIG. 10 is a top plan view of the ring member of the battery terminal according to the second embodiment.
Figure 11:
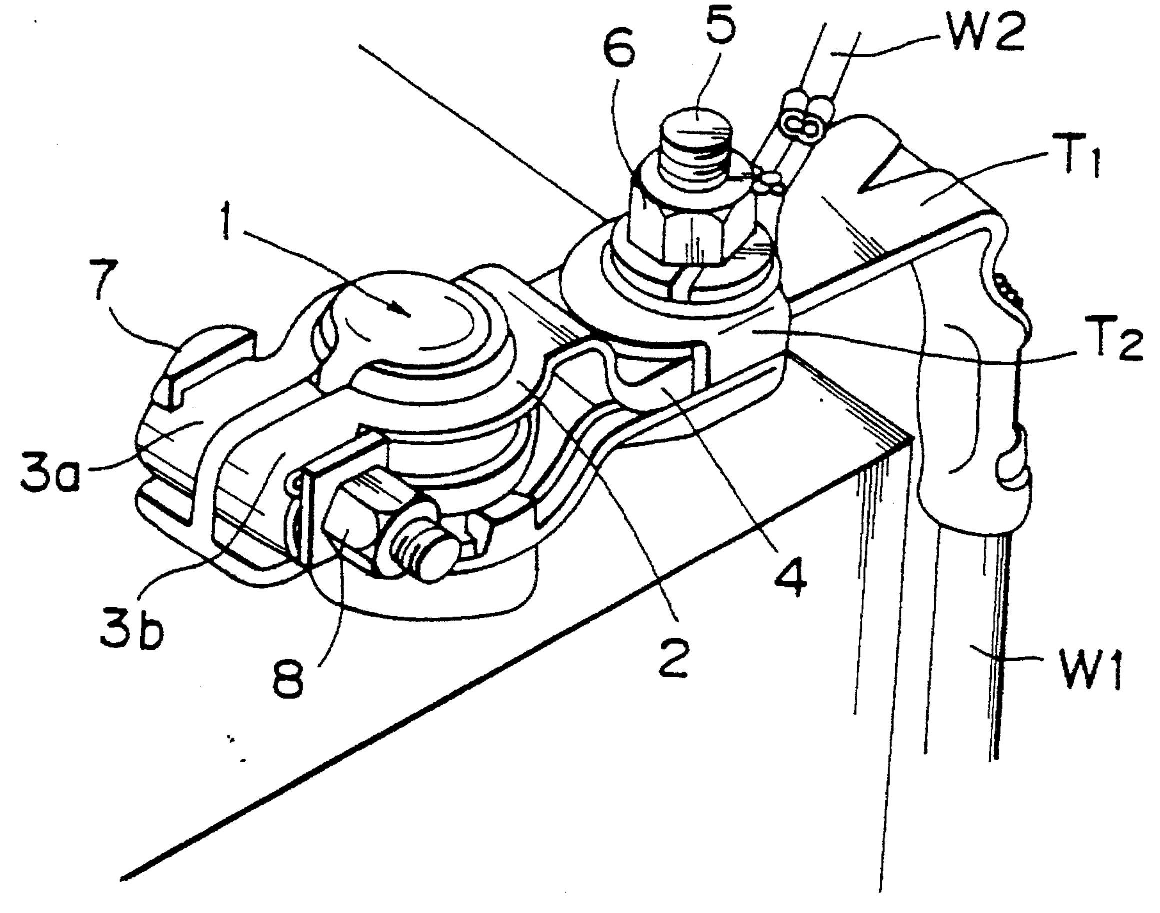
Fig. 11 PRIOR ART
FIG. 11 is a perspective view of a conventional battery terminal.

In a battery terminal according to this second embodiment, the main member 11, ring member 12, and seal member 13 are assembled as shown in FIG. 7, the clamping member 11f of the main member 11 passes through the battery post fitting hole 12h of the ring member 12, and is therefore opposite the clamping member 12j of the ring member 12.

When assembled as shown in FIG. 7, the battery post fitting holes in the seal member 13, main member 11, and ring member 12 are fit over the battery post 1. As in the first embodiment above, the terminals T1 and T2 are fitted over the stud bolt 14, and a nut 15 is then tightened using an impact wrench or similar tool.

When the nut 15 is tightened, the ring member 12 is forced down, thereby clamping the clamping member 12j of the ring member 12 against one side of the battery post 1 and the clamping member 11f of the main member 11 against the other side of the battery post 1. The battery post 1 is thus clamped between the two clamping members 11f and 12j, and the battery terminal is secured to the battery post.

As will be known from the above description of the invention, the two tasks of securing the cable crimping terminals to the battery terminal and securing the battery terminal to the battery post can be accomplished by a single thread tightening operation, thereby improving job productivity.

In addition, because the thread tightening operation is performed from above the battery post rather than horizontally to the battery post, interference between the tightening tool and other components is prevented during the thread tightening operation, and the problem of the tightening tool easily contacting other components is eliminated.

In addition, because the cables are not connected to the battery terminal when assembling the battery terminal to the battery post, it is not necessary to consider interference between the cables and other components during battery terminal design, and it is sufficient to orient the battery terminal cable connector to prevent interference between the cable and other components when connecting the cable. As a result, the degree of freedom in battery terminal design is also increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery terminal for connecting a battery post to a cable, comprising:

(A) a substantially flat main member comprising:

a first post fitting portion having a first battery post fitting hole for receiving the battery post therein;

a ring support provided at a first side of the first post fitting portion;

a cable connector portion provided at a second side of the first post fitting portion; and a stud bolt projecting vertically upward from said cable connector portion;

(B) a ring member placed over said main member, comprising:

a second post fitting portion having a second battery post fitting hole for receiving the battery post and a cone-shaped clamping piece projecting upward around an inside edge of the second battery post fitting hole;

a clamping member on one side of the second post fitting portion; and;

a cable connector portion with a bolt hole on an other side of the second post fitting portion through which said stud bolt is inserted, said cable connector portion being bent at a predetermined angle with respect to said second post fitting portion; and (C) a nut mounted onto said stud bolt, whereby the battery terminal is assembled such that the end of the clamping member of the ring member is supported by the ring support of the main member, and the second post fitting portion and the cable connector portion of the ring member are inclined to the main member, and wherein tightening of the nut onto the stud bolt clamps the cable terminal to the ring member and simultaneously pushes the clamping piece of the ring member at an angle over the battery post and down against the battery post;

said main member and said ring member being constructed and arranged such that said first battery post fitting hole is separately formed in and defined by said main member and said second battery post fitting hole is separately formed in and defined by said ring member.

2. A battery terminal according to claim 1, wherein said second post fitting portion of the ring member includes a first slit along a side of the clamping member, and wherein said clamping member includes a second slit continuous to said first slit along a widthwise center axis of the clamping member to divide the clamping member into first and second clamping members, whereby, when the nut is tightened onto the stud bolt with the second post fitting portion of the ring member over and at an angle to the battery post, the first and second slits open as the post fitting portion of the ring member is pushed down and is deformed coaxially to the battery post.

3. A battery terminal according to claim 1, further comprising a seal member on which said main member is placed, said seal member including engaging members at opposite sides for engaging opposite edges of said clamping member.

4. A battery terminal for connecting a battery post to a cable, comprising:

(A) a substantially flat main member comprising:

a first post fitting portion having a first battery post fitting hole for receiving the battery post therein;

a first semiconical clamping piece projecting at one side of an inside face of the first battery post fitting hole and projecting vertically upward from said first post fitting portion of said main member;

a ring support provided at a first side of the first post fitting portion;

a cable connector portion provided at a second side of the first post fitting portion; and a stud bolt projecting vertically upward from said cable connector portion;

(B) a ring member placed over said main member, comprising:

a second post fitting portion having a second battery post fitting hole for receiving the battery post therein and a second semiconical clamping piece projecting at one side of an inside edge of the second battery post fitting hole on a side opposite that of the first semiconical clamping piece of the main member and projecting vertically upward from said second post fitting portion;

a clamping member on one side of the second post fitting portion; and a cable connector portion with a bolt hole on an other side of the second post fitting portion through which said stud bolt is inserted, said cable connector portion being bent at a predetermined angle with respect to said second post fitting portion; and (C) a nut mounted onto said stud bolt, whereby the battery terminal is assembled such that the end of the clamping member of the ring member is supported by the ring support of the main member, and the second post fitting portion and the cable connector portion of the ring member are inclined to the main member, and such that tightening of the nut onto the stud bolt clamps the cable terminal to the ring member and simultaneously pushes the second semiconical clamping piece of the ring member, which is at an angle over the battery post, and moved down to clamp the battery post between the first and second clamping pieces of the ring member and the main member;

said main member and said ring member being constructed and arranged such that said first battery post fitting hole is separately formed in and defined by said main member and said second battery post fitting hole is separately formed in and defined by said ring member.

5. A battery terminal according to claim 1, wherein said bolt hole of said cable connector portion is oval.

6. A battery terminal according to claim 1, wherein said post fitting portion of said ring member and said cable connector portion of said ring member are in different planes with respect to each other.

7. A battery terminal according to claim 3, wherein said substantially flat main member, said ring member, and said seal member are constructed and arranged to permit the battery terminal to be placed over the battery post after said terminal is assembled.

8. A battery terminal according to claim 1, wherein said cone-shaped clamping piece of said ring member is dimensioned to contact the outside face of the battery post when said cone-shaped clamping piece is fully seated on said post.

9. A battery terminal according to claim 1, wherein said cone-shaped clamping piece projects upward from said post fitting portion of said ring member.

* * * * *